United States Patent [19]
Foster

[11] Patent Number: 6,052,134
[45] Date of Patent: Apr. 18, 2000

[54] MEMORY CONTROLLER AND METHOD FOR DYNAMIC PAGE MANAGEMENT

[75] Inventor: Joseph E. Foster, Spring, Tex.

[73] Assignee: Compaq Computer Corp., Houston, Tex.

[21] Appl. No.: 08/995,705

[22] Filed: Dec. 22, 1997

[51] Int. Cl.⁷ .................................................. G06F 13/16
[52] U.S. Cl. ............................ 345/521; 345/508; 711/5; 711/105; 365/203; 365/238.5
[58] Field of Search ..................... 345/521, 519, 345/520, 501; 711/154, 105; 365/203, 238.5

[56] References Cited

U.S. PATENT DOCUMENTS

| | | | |
|---|---|---|---|
| 5,159,676 | 10/1992 | Wicklund et al. | 711/107 |
| 5,493,663 | 2/1996 | Parikh | 711/159 |
| 5,636,173 | 6/1997 | Schaefer | 365/230.03 |
| 5,715,421 | 2/1998 | Akiyama et al. | 365/203 |
| 5,745,913 | 4/1998 | Pattin et al. | 711/105 |
| 5,848,025 | 12/1998 | Marietta et al. | 365/238.5 |
| 5,859,989 | 1/1999 | Olarig et al. | 345/519 |
| 5,864,512 | 1/1999 | Buckelew et al. | 365/230.01 |
| 5,893,136 | 4/1999 | Stolt et al. | 711/105 |

*Primary Examiner*—Kee M. Tung
*Assistant Examiner*—Sy D. Luu
*Attorney, Agent, or Firm*—Conley, Rose & Tayon, P.C.; Robert C. Kowert

[57] ABSTRACT

A computer is provided having a memory system supporting page mode accessing. A memory controller may be provided in a bus interface unit coupled between a CPU bus, and a mezzanine bus, or PCI bus. The memory controller includes logic that provides for dynamic management of page accessing. The memory controller may include logic for monitoring the page hit:precharge ratio for accesses to system memory and dynamically switch between a paging state of operation and an auto-precharge state of operation according to the hit:precharge ratio. A configuration register may be provided to select dynamic mode in which the memory controller dynamically enables/disables paging to improve performance. The configuration register may also be programmed to manually enable/disable paging. The memory controller may include a page table for tracking open pages. The system memory may include SDRAM devices.

30 Claims, 5 Drawing Sheets

MEMORY CONTROLLER AND METHOD FOR DYNAMIC PAGE MANAGEMENT

BACKGROUND OF THE INVENTION

1. Field of the Invention

This invention relates to a memory controller for controlling memory within a computer and, more particularly, to a memory controller which dynamically enables/disables memory paging depending on the page hit to precharge ratio for accesses to the memory.

2. Description of the Related Art

A conventional modem computer system includes at least one central processing unit (CPU) located on a CPU (host or local) bus, a mezzanine of peripheral buses, a graphics device coupled to either the CPU or peripheral bus, system memory, and a memory controller for communicating memory access requests from CPU bus and peripheral bus devices to the system memory. Coupled between the various busses are bus interface units. According to somewhat known terminology, the bus interface unit coupled between the CPU bus and a first peripheral bus, such as a PCI bus, is often termed the "north bridge". Similarly, the bus interface unit between the PCI bus and a second peripheral bus is often termed the "south bridge". Typically, the memory controller is a separate integrated circuit device connected to the CPU bus and the system memory. The memory controller receives memory access requests from, e.g., the PCI bus, a graphics port (e.g., AGP), 1394, etc., and/or the CPU. A memory access request includes address and read/write information. The memory controller satisfies memory access requests by asserting the appropriate control signals to the system memory. For DRAM-type memory, these control signals may include address signals, row address strobe (RAS), column address strobe (CAS), and memory write enable (MWE).

The system memory is typically comprised of random access memory (RAM) cells. One type of RAM typically used for main memory in modern computer systems is dynamic random access memory (DRAM). DRAM is organized as an array including rows and columns of memory cells where one bit is stored in a cell. A number of DRAM arrays are combined in parallel to form a word width, and a word is accessed by providing a row address and column address to the DRAM. Normally, the row address and column address are multiplexed on the same signals to obtain a smaller more cost effective structure. The row address is latched in the DRAM by a row address strobe (RAS) and the column address is latched by a column address strobe (CAS). A given row and column address selects a word location to be read or written. To strobe in an address, the RAS or CAS signal is asserted when the corresponding address is valid on the memory address signals. The faster address information may be strobed into the DRAM, the faster the memory may be accessed. However, DRAM devices have specified minimum timing requirements that limit how fast memory accesses may be performed. For example, after RAS is asserted to strobe-in a row address, RAS must then be unasserted for a specified amount of time called the RAS precharge time.

Larger memory systems have multiple banks of DRAM having separate RAS and CAS signals to distinguish between banks. The DRAM forming each bank is often grouped on single in-line memory modules (SIMMs). Various sizes and organizations of SIMMs are often employed. Other structures, such as dual in-line memory modules (DIMMs) are also employed.

Throughput to the system memory is one of the most important factors for determining system performance. Several techniques exist to improve memory throughput. One such technique is interleaving. Interleaving involves sequencing between multiple memory banks so that one bank is accessed during the CAS precharge time for another bank. In this manner, memory accesses are not delayed by waiting for the precharge time.

Another technique used to improve memory throughput is called paging. A page may be defined as an area in a memory bank accessed by a given row address. A page is "opened" when a given row address is strobed in. If a series of access are all to the same page, then once the page is open, only column addresses need be strobed in to the memory bank. Thus, the RAS precharge time is saved for each subsequent access to the open page. Therefore, paging involves leaving a memory page open as long as accesses continue to "hit" within that page. Once an access "misses" the page, the old page is closed and a new page is opened. Opening a new page may incur a precharge time, since only one page may typically be open within a memory bank. If the new page is in the same memory bank, RAS must be precharged before a new page may be opened. If the new page is in a different bank, then the RAS precharge time may already be satisfied for that bank, avoiding an additional precharge delay.

Paging provides the greatest performance enhancement when memory request are frequently page hits. Typically, applications that accesses memory addresses sequentially will benefit from paging the most, because they will have a high page hit ratio. However, some applications result in more random memory accesses and therefore have a lower page hit ratio. If an application has a poor page hit ratio, the memory controller may have to frequently be switching to new pages. Every time a new page is opened in the same bank, a precharge delay will be incurred. If the page hit ratio is poor, paging may actually decrease performance because of this additional precharge delay.

Therefore, it is desirable to have a memory controller that improves system memory throughput. It would be desirable to have a memory controller that performs paging when paging is advantageous, and does not perform paging when no paging is more advantageous. It is further desirable to have a memory controller that continually monitors access patterns to determine when paging is advantageous and modifies paging operation accordingly.

SUMMARY OF THE INVENTION

The problems outlined above are in large part solved a memory controller within a computer system that provides for dynamic page mode management. The memory controller controls access to the system memory which may include multiple memory banks. The memory controller may include a page state machine for determining when the memory controller operates in a page access state or a non-paging auto-precharge state. The memory controller may also include hit/precharge logic that compares current accesses to the open pages within system memory. The hit/precharge logic determines whether or not an access is a page hit or a page miss that may also require a precharge. The hit/precharge logic also calculates a hit to precharge ratio. If the hit to precharge ratio falls below a certain threshold, the hit/precharge logic indicates to the page state machine to switch to the auto-precharge state. If the ratio is above the threshold, the hit/precharge logic indicates to the page state machine to switch to paging state. The memory controller may also include a page table containing entries for tracking the status of open pages within the system memory. A configuration register may also be provided for programmably selecting between modes of operation. The configuration register may be programmed to select a paging mode in which the page state machine remains in the paging state, or an auto-precharge mode may be selected in which the page state machine remains in the auto-precharge state. A dynamic mode may be programmably selected in which the page state machine dynamically switches between the paging and auto-precharge states according to the hit to precharge ratio as calculated in the hit/precharge logic.

Broadly speaking, the present invention contemplates a computer. The computer comprises a processor which may include a cache system. The processor and/or cache are coupled to a CPU bus. A north bridge device interfaces the CPU bus to an advanced graphics port, to system memory, and to a mezzanine peripheral bus structure. A graphic accelerator with frame buffer for providing a graphical display may be couple to the advanced graphics port. The mezzanine bus structure may include a PCI bus coupled to a south bridge for interfacing a slower peripheral bus to the PCI bus. I/O devices may be coupled to both the PCI bus and the slower peripheral bus. A memory controller, according to the present invention, may be included within the north bridge device or as a separate component.

Generally, a computer system, according to the present invention, includes at least one memory bank configured to support page accesses. A memory controller is coupled to the memory bank or banks and controls access to the memory. The memory controller is configured to dynamically switch between a paging mode and an auto-precharge mode depending upon a hit to precharge ratio for accesses to the memory. When in paging mode the memory controller leaves open an accessed page in a memory bank after the access. In auto-precharge mode the memory controller closes the accessed page in the memory bank after the access. The computer may also include a central processing unit and a CPU bus linking the CPU to the memory controller. Typically, the CPU bus is clocked by a system clock and the CPU may send memory access requests to the memory controller across the CPU bus. A peripheral bus may also be couple to the memory controller and the memory controller may receive memory requests from the peripheral bus. A graphics device may also be coupled to the memory controller and the memory controller may receive memory access requests from the graphics controller.

The memory controller may comprise hit/precharge logic for tracking the hit:precharge ratio. The memory controller may be adapted to switch to the paging mode when the hit:precharge ratio is above a threshold, and switched to the auto-precharge mode when the hit to precharge ratio is below the threshold. The memory controller may be adapted to switch to other precharge modes if the current access requires a precharge, and switch to a paging the mode if the current request is to the same page as the last request. The memory controller may also include a page table having entries for tracking which memory pages are left open. The hit/precharge logic may compare the current access to the page table entries to determine if the current access is a hit to an open page, a miss, or a miss requiring a precharge.

A configuration register may be coupled to the memory controller for indicating an operation mode to the memory controller. The configuration register may be programmable to select the operation mode as a paging mode, an auto-precharge mode, or a dynamic mode. When in auto-precharge mode, the memory controller operates in an auto-precharge state where the memory controller closes accessed pages after each access. When in paging mode, the memory controller operates in a paging state where the memory controller leaves open the accessed page. And when in the dynamic mode, the memory controller dynamically switches between the auto-precharge state and the paging state depending upon a hit:precharge ratio. Hit/precharge logic tracks the hit:precharge ratio when the dynamic mode is selected. The memory controller switches to the paging state when the hit:precharge ratio is above a threshold, and switches to the auto-precharge state when the hit:precharge ratio is below the threshold. The threshold may be set such that the memory controller switches to the auto-precharge state if the current access requires a precharge, and switches to the paging state if the current request is to the same page as the last request. A page table is provided having entries for tracking which memory pages have been most recently accessed. The hit/precharge logic compares the current access to the page table entries to determine if the current is a hit to a page indicated in one of the table entries or a miss requiring a precharge.

The present invention also contemplates a system including at least one memory bank that supports page accesses and a memory controller coupled to the memory bank or banks for controlling accesses to the memory. The memory may include banks of synchronous DRAM devices. The memory controller may be adapted to dynamically switch between a paging mode and an auto-precharge mode. When in the paging mode, the memory controller leaves open the accessed page, and when in auto-precharge mode the memory controller closes the accessed page. In one embodiment, the memory controller may dynamically switch between the paging mode and auto-precharge mode according to a hit:precharge ratio. The memory controller may switch to the paging mode if the current request is to the same page as the last request, and to the auto-precharge mode if the current access requires a precharge. Alternatively, the memory controller may switch to the auto-precharge mode if a plurality of consecutive accesses require a precharge, and switch to the paging mode if a plurality of consecutive accesses are to the same page. Also, alternatively, the memory controller may dynamically switch between the paging mode and the auto-precharge mode according to the source of the memory access request. Also, the memory controller may dynamically switch between the modes accordingly to a power management state.

The present invention further contemplates a method for page management in a computer system. The method includes sending a memory access request to a memory controller. The method further includes performing a memory access corresponding to the memory access request and updating a hit:precharge ratio as each memory access is performed. The method further includes switching to a page mode if the hit:precharge ratio is above a threshold where the memory page for a current access remains open after the access, and switching to an auto-precharge mode if the hit:precharge ratio is below a threshold where a memory page for a current access is closed immediately after the access.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
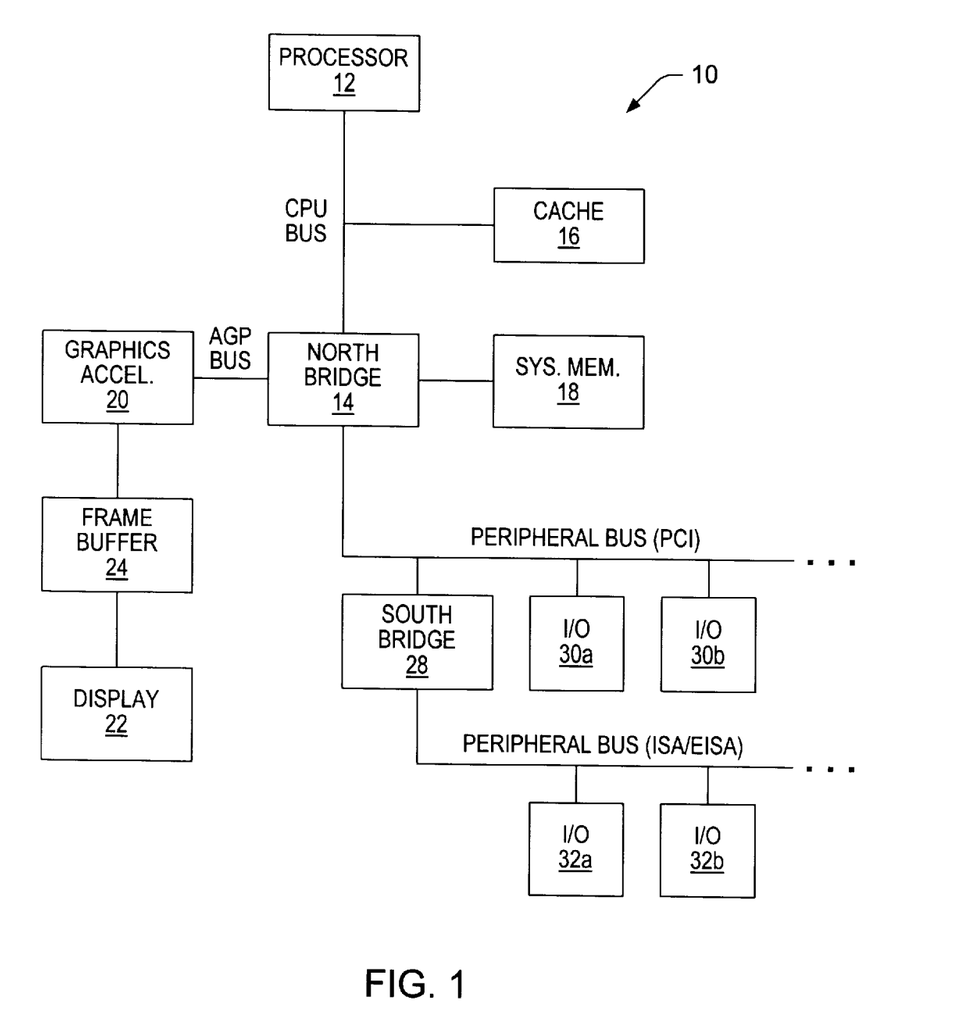
FIG. 1 is a block diagram of a computer system comprising north and south bus bridges.

Turning to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 can be embodied within or external to CPU 12.

North bridge 14 provides an interface between components clocked at dissimilar rates or perhaps, similar but not synchronized rates. According to one embodiment, north bridge 14 interfaces a slower PCI bus and a faster CPU bus. North bridge 14 may also contain a memory controller which allows communication to and from system memory 18. Alternatively, the memory controller may be a separate device. In a preferred embodiment, the memory controller is included within north bridge 14. A suitable system memory 18 comprises memory devices that may be organized in multiple banks. Various memory devices may be employed such as dynamic random access memory (DRAM), extended data out dynamic random access memory (EDO DRAM), or synchronous DRAM (or SDRAM) among others. North bridge 14 may also include a graphics port to allow connection to a graphics accelerator 20. A graphics port, such as AGP, provides a high performance, component level interconnect targeted at three dimensional graphic display applications and is based on performance extensions or enhancements to PCI. AGP interfaces are generally standard in the industry, the common description of which is available from Intel Corporation. Although AGP is employed in the preferred embodiment, other graphics interfaces may be employed. Alternatively, a graphics device may be coupled directly to the CPU bus, or to the PCI bus, or to another peripheral bus.

Generally speaking, AGP is physically, logically, and electrically independent of the PCI bus and intended for the exclusive use of a display device 22 coupled to the graphics port (or AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

North bridge 14 is generally considered an application specific chip set, or application specific integrated circuit ("ASIC") that provides connectivity to various buses, and integrates other system functions such as memory interface and possibly functions such as P1394. System memory 18 is considered the main memory and refers to a portion of addressable memory that the majority of memory access target. System memory 18 is preferably accessed via a memory controller within north bridge 14, and is typically the largest continuous memory space of computer 10.

Unlike the CPU bus which runs at frequencies of, e.g., 66 MHz or 100 MHz, the PCI bus often runs at speeds of approximately 33 MHz. A south bridge 28 is coupled between the PCI bus and the peripheral bus. Similar to north bridge 14, south bridge 28 is an ASIC or group of ASICs that provide connectivity between various buses, and may also include system functions. I/O devices 30 and 32 may be coupled to the PCI bus and slower peripheral bus, respectively. Typically, I/O devices 30 are those that require higher throughput than I/O devices 32 located on the slower peripheral bus. Typical I/O devices may include network interfaces, modem, hard drive adapters, etc.

Figure 2:
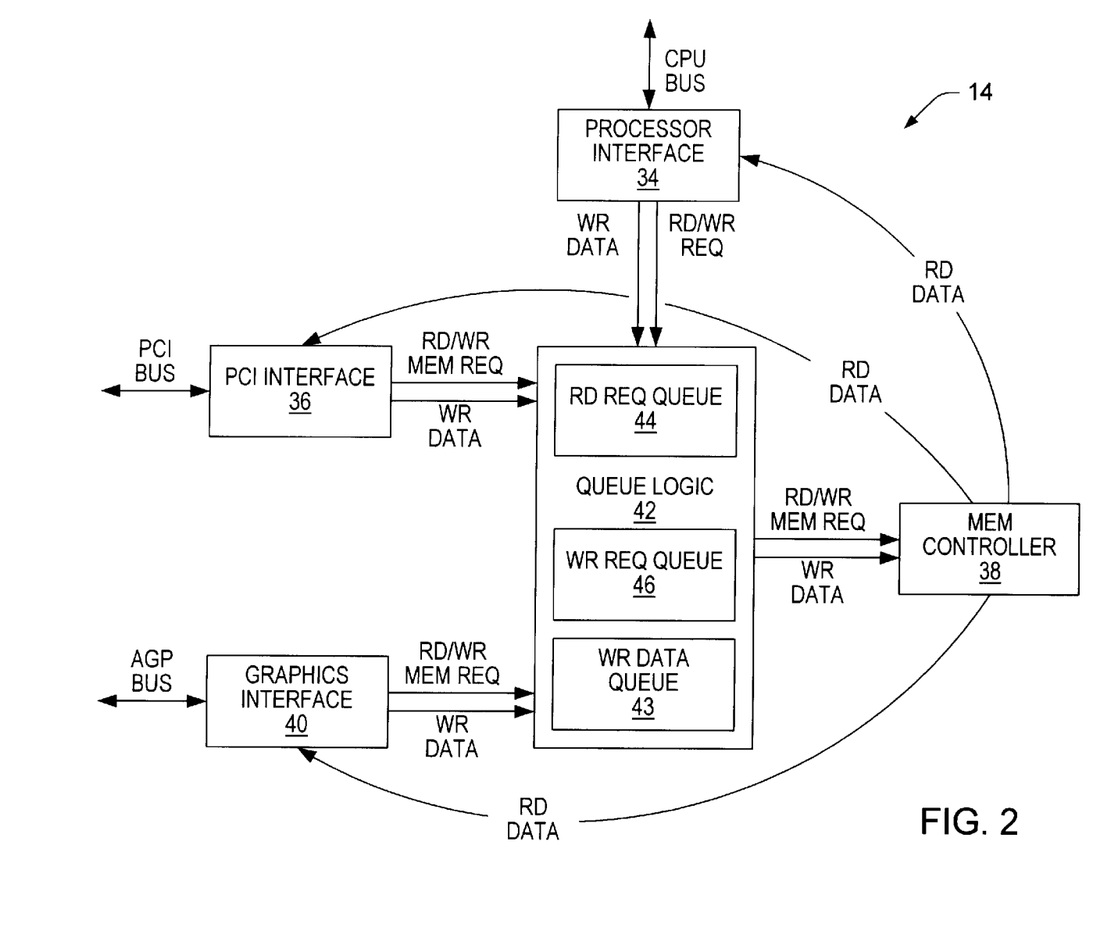
FIG. 2 is a block diagram of the north bridge and coupling thereto.

Turning to FIG. 2, details regarding north bridge 14 are shown for one embodiment of the present invention. The various sub-components of north bridge 14 may be connected upon a monolithic substrate for high performance systems including portable computers. North bridge 14 operates in conjunction with south bridge 28 and includes at least four functional blocks: CPU interface 34, PCI interface 36, memory controller 38 and graphics (or AGP) interface 40. Interfaces 34, 36 and 40 each contain transient buffers where address and data (write cycles only) information for memory cycles are stored. These interfaces communicate with memory controller 38 via queue manager 42.

Queue manager 42 arbitrates from among various read and write memory request emanating from interfaces 34, 36 and 40. Queue manager 42 further includes a read request queue 44, a write request queue 46 and a write data queue 43. Queue manager 42 receives read/write requests from the various interfaces, arbitrates between them, and loads the requests in either the read request queue or the write request queue 44 and 46, respectively. Queue manager 42 also includes a write data queue 43 which receives write data destined for memory controller 38. Queue manager 42 does not give a higher priority to any one interface, allowing isochronous devices to be added without substantial changes to the overall design.

Figure 3:
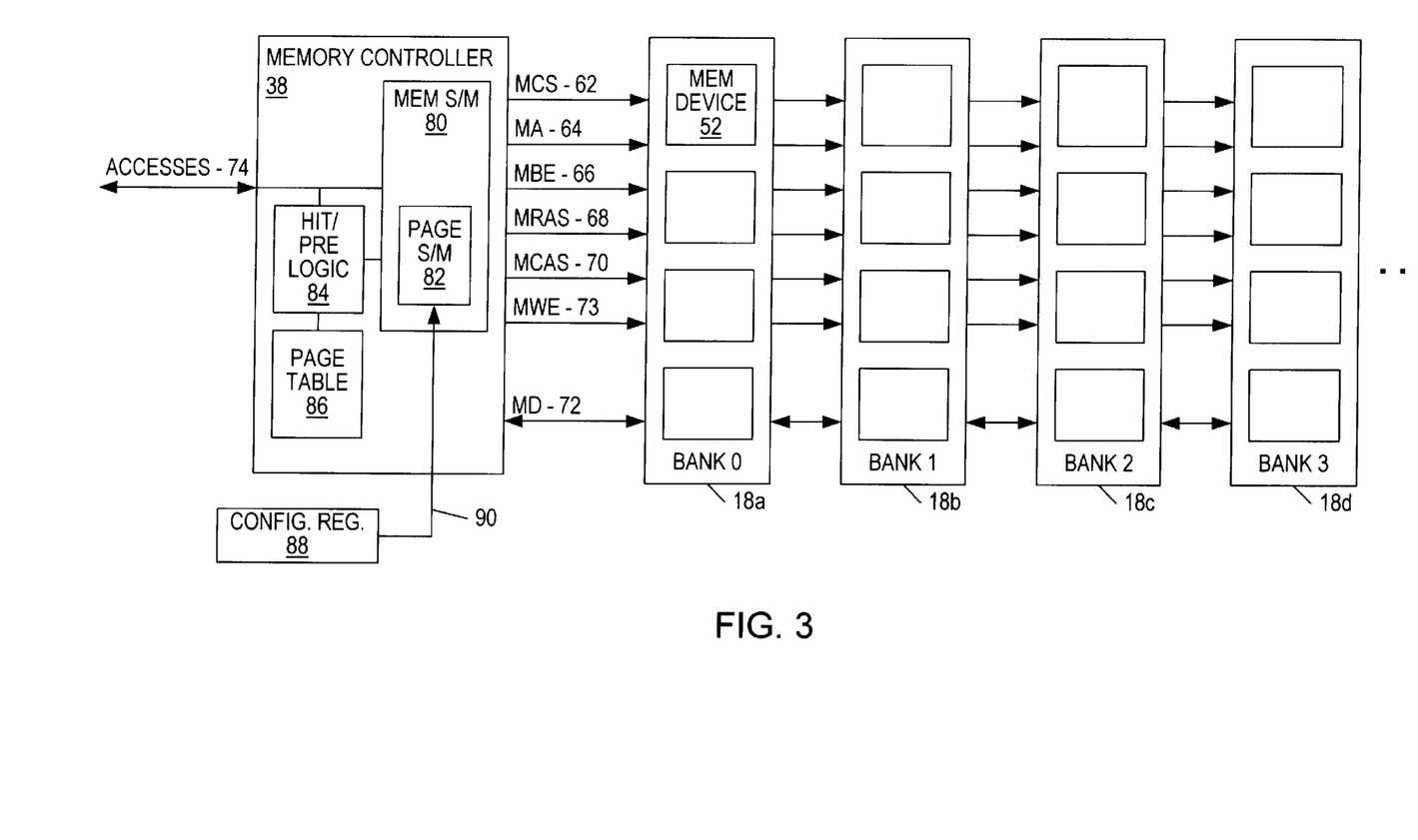
FIG. 3 is a block diagram a memory controller that may be include within the north bridge or as a separate device and banks of memory arrays.

Referring to FIG. 3, memory controller 38 is shown connected to system memory 18. Memory controller 38 receives requests (or accesses) from the read and write request queues of FIG. 2 as indicated by reference numeral 74, and dispatches those accesses to system memory 18 using various address, data and control signals. For example, if a read request is issued, then memory controller 38 dispatches the address on MA signals 64 with the appropriate assertion of control signals, receives the read data from the selected memory bank on MD signals 72 and provides the data to the requesting interface within north bridge 14.

System memory 18 may include a plurality of memory banks. FIG. 3 illustrates memory banks 18a–d. However no particular limitation is placed on the bank configuration. The present invention may apply to a single bank or to multiple banks. Each bank may include a plurality of memory devices 52. Each memory device 52 may be a physical memory chip.

No limitation is placed by the present invention on the number of memory devices 52 within each bank. Typically, each bank provides access to a memory area with a 64-bit width. Data is accessed on MD signals 72. Thus, for a 64-bit width, there word be sixty four MD signals 72 and each bank 18a–d would be coupled to the sixty four MD signals 72. For a 64-bit width, each bank 18a–d may include four 16-bit memory devices 52 to provide a 64-bit wide bank. In some embodiments, each bank 18a–d, may be further divided into multiple banks.

Memory devices 52 may be any memory device known in the art capable of supporting page mode addressing. For example, memory devices 52 may be regular DRAM devices or EDO DRAM devices. In a preferred embodiment, memory devices 52 are synchronous DRAM devices. A synchronous DRAM ("SDRAM") is similar to an asynchronous DRAM except that synchronous control logic is added. Essentially, SDRAM synchronizes all address, data and control signals with a single system clock (not shown in FIG. 3). The system clock is preferably the same clock which operates the CPU bus up to, for example, 100 MHz. An SDRAM offers substantial advantageous over asynchronous DRAMs. For example, SDRAM provides automatic bursting with a programmable burst length. Also, a single SDRAM device may be internally organized in multiple banks to allow on-chip interleaving. Also, faster throughput may be achieved since data is synchronized to the bus clock. Asynchronous DRAMs are directly controlled by asserting the control signals such as RAS, CAS, and MWE. By contrast, an SDRAM is controlled by separate commands for different functions. A command is defined by the state of the control signals at an active clock edge. Example commands are bank activate/row-address entry, column-address entry write, column-address entry read, bank deactivate/precharge, and refresh. While not necessary for an understanding of the present invention, more detail on SDRAM operation may be found in the device data sheet for an SDRAM such as the TMS626812 by Texas Instruments.

Memory controller 38 provides memory chip select (MCS) signals 62 to system memory 18. MCS signals 62 serve as chip selects or bank selects for memory banks 18a–d. For embodiments employing SDRAM devices, MCS signals 62 are used select the active bank. MCS signals 62 may not be necessary for other embodiments. For example, regular asynchronous DRAM banks may be differentiated by RAS signals.

Memory controller 38 also provides memory address (MA) signals 64 to system memory 18. Memory controller 38 derives MA signals 64 from the address provided from the requester through the queue logic 42 (FIG. 2). Memory controller 38 multiplexes row and column addresses on MA signals 64 to system memory 18. A row address is provided on MA signals 64 followed by a column address or series of column addresses.

Memory controller 38 asserts memory row address strobe (MRAS) 68 to strobe the row address on MA signals 64 into the appropriate memory bank 18a–d. For non-synchronous DRAM, MRAS 68 remains asserted during the access. For synchronous DRAM, MRAS 68 is pulsed as part of the bank activate/row-address entry command. For synchronous DRAM, MA signals 64, MRAS 68 and other control signals are sampled by the SDRAM on clock edges where a clock such as the CPU bus clock is provided to the SDRAM. Memory controller 38 also provides memory column address strobes (MCAS) 70 to system memory 18. After a row address has been entered, MCAS 70 is asserted to strobe a column address on MA signals 64 into the active memory bank. Again, for SDRAM, MCAS 70 is synchronously sampled as part of a column-address entry read or write command.

Memory controller 38 provides memory byte enable (MBE) signals 66 to indicate which bytes in an access are valid. For write operation, for example, MBE signals 66 may indicate which bytes in a 64 bit word are to be modified at the addresses as specified by the row and column addresses. Memory controller 38 provides memory write enable (MWE) 73 to distinguish between read and write operations.

Data is transferred between memory controller 38 and system memory 18 on memory data (MD) signals 72. In a preferred embodiment, MD signals 72 comprise sixty four bit signals for a sixty four bit width. For read operations, the selected one of memory banks 18a–d provides data on MD signals 72 according to the row and column address. For write operations, memory controller 38 provides data on MD signals 72 to be written to the active memory bank at the addresses specified by the row and column address. Memory controller 38 transfer data to/from the various interfaces as illustrated in FIG. 2.

The proper sequencing of the memory control signals discussed above is provided for by memory state machine and logic 80 within memory controller 38. General configuration for state machines and logic to control the memory control signals such as RAS and CAS for memory devices is well understood in the memory controller art. Therefore, memory state machine and logic 80 is not described in detail except in regard to what is necessary for an understanding of the present invention. Memory state machine and logic 80 supports page accessing of system memory 18. Page accessing or paging refers to leaving a page open within a memory bank by leaving a row defined by a row address active within the bank. Subsequent access to the same row (page) may be satisfied by providing only the column address, avoiding the time associated with providing a row address. Therefore, as long as accesses are "page hits", the accesses may be completed more rapidly.

Page accessing may also be disabled in memory controller 38 so that a accessed page is not left open. For regular DRAM, a page is closed by unasserting RAS. For SDRAM, a page may be closed either by a specific bank deactivate (precharge) command or by read/write command that automatically close the page upon completion of the access. When no page is open, the bank precharges so that the RAS precharge time for a given memory device may be satisfied.

Paging state machine 82 controls whether or not memory state machine and logic 80 performs paging or non-paging accesses. Paging provides the greatest performance enhancement when memory requests are frequently page hits. Typically, applications that access memory addresses sequentially will benefit from paging the most, because they will have a high page hit ratio. However, some applications result in more random memory accesses and therefore have a lower page hit ratio. If an application has a poor page hit ratio, the memory controller may have to frequently be switching to new pages. Every time a new page is opened in the same bank, a precharge delay will be incurred. If the page hit ratio is poor, paging may actually decrease performance because of this additional precharge delay. It is understood that paging state machine 82 is shown as a separate functional block for clarity. In actual implementation, paging state machine 82 may be implemented as a separate state machine or as part of other control logic such as memory control state machine and logic 80. Page state machine 82 and the other functional blocks described herein need not be implemented as classic state machines or any other particular implementation. Any suitable circuit/logic implementation that performs the functions described herein may be used.

Configuration register 88 may be included to provide mode select signal(s) 90 to paging state machine 82. Configuration register 88 may be a programmable storage location within memory controller 38 or may be a separate register as shown in FIG. 3. In a preferred embodiment, configuration register 88 is one of or part of one of a plurality of configuration registers within north bridge 14 (FIG. 1) where memory controller 38 is also located in north bridge 14. Configuration register 88 may be programmed by system software to select paging mode or auto-precharge mode (non-paging). Configuration register 88 may be addressable in the system I/O address space. Configuration register 88 may also be programmed to select dynamic mode. Dynamic mode is described in detail below. Configuration register 88 indicates the selected mode on select signal(s) 90 to page state machine 82.

Memory controller 38 may also include hit/precharge logic 84. Hit/precharge logic 84 monitors when accesses hit or miss a page in system memory 18. Hit/precharge logic 84 may also determine if a miss is a request that requires a precharge (i.e., an access to a new page in non-precharged bank—usually the same bank as the previous access). Therefore, hit/precharge logic 84 may calculate a hit:precharge ratio for accesses to system memory 18. In a preferred embodiment, a hit:precharge ratio is used. The invention is hereafter described in regard to a hit:precharge ratio, but the following may also apply to other indications of page hit performance.

A high hit:precharge ratio means that accesses are frequently addressed to an open page so that the faster page access cycle time may be utilized. A low hit:precharge ratio indicates a lower frequency of page hits so that the row address time must also be included in many accesses. A low hit:precharge ratio also indicates that a precharge time must frequently be incurred. Therefore, if the hit:precharge ratio falls below a certain threshold, page mode accessing may actually be slower than non-page mode accessing. This is because in non-paging (auto-precharge) mode the page is immediately closed after each access. Therefore, the just-accessed bank may precharge during idle cycles or accesses to other banks. However, in paging mode the page is left open. If an access is to a new page in the same bank, the open page must be closed and a RAS precharge time incurred before the new page may be opened. Thus, for low page hit:precharge ratios non-paging (auto-precharging) may actually provide better performance.

Configuration register 88 may be programmed to select a dynamic mode in which page state machine 82 dynamically switches between a paging state of operation and an auto-precharge state of operation according to a control signal(s) from hit/precharge logic 84. Hit/precharge logic 84 continuously monitors accesses and indicates to paging state machine 82 to change states "on the fly". Thus, dynamic mode allows paging to be enabled/disabled dynamically to maximize performance. Dynamic mode allows the paging state to be adjusted for maximum performance as access patterns change. Therefore, dynamic mode is much more efficient than controlling paging directly through a configuration register.

The threshold at which it is desirable to switch between paging and auto-precharge mode may be varied. For example, a set ratio for a specific application may be chosen. Alternatively, auto-precharge state may be switched to after a certain number of consecutive misses requiring precharge or a certain frequency thereof. Paging state may be switched to after a certain number of accesses that would have been page hits or a certain frequency thereof. In a preferred embodiment, a simple approach is taken to avoid complexity. When in dynamic mode in the preferred embodiment, auto-precharge mode is switched to when an access occurs that requires a precharge and paging mode is switched to when an access occurs that would have been a page hit if paging was enable, i.e. the current access is to the same page as the last access. The basic assumption being that if an accesses requires a precharge then it is likely the next access may require a precharge and if an access is a page hit (or would've been a page hit) then it is likely the next access will be a page hit.

However, the present invention is not limited to any particular method for determining when to change states. For example, instead of calculating a hit:precharge ratio, the paging state may be selected according to the source of the memory request. For example, it may be determined that requests from the CPU bus are more likely to be page hits whereas requests from the PCI or peripheral buses are more likely to be page misses and/or require a precharge. Also, it may be that frequent opening and closing of memory pages consumes more power than leaving pages open as long as possible. Therefore, a power management state (i.e. low power, sleep, fast) may be considered for determining when to switch paging states.

Figure 4:
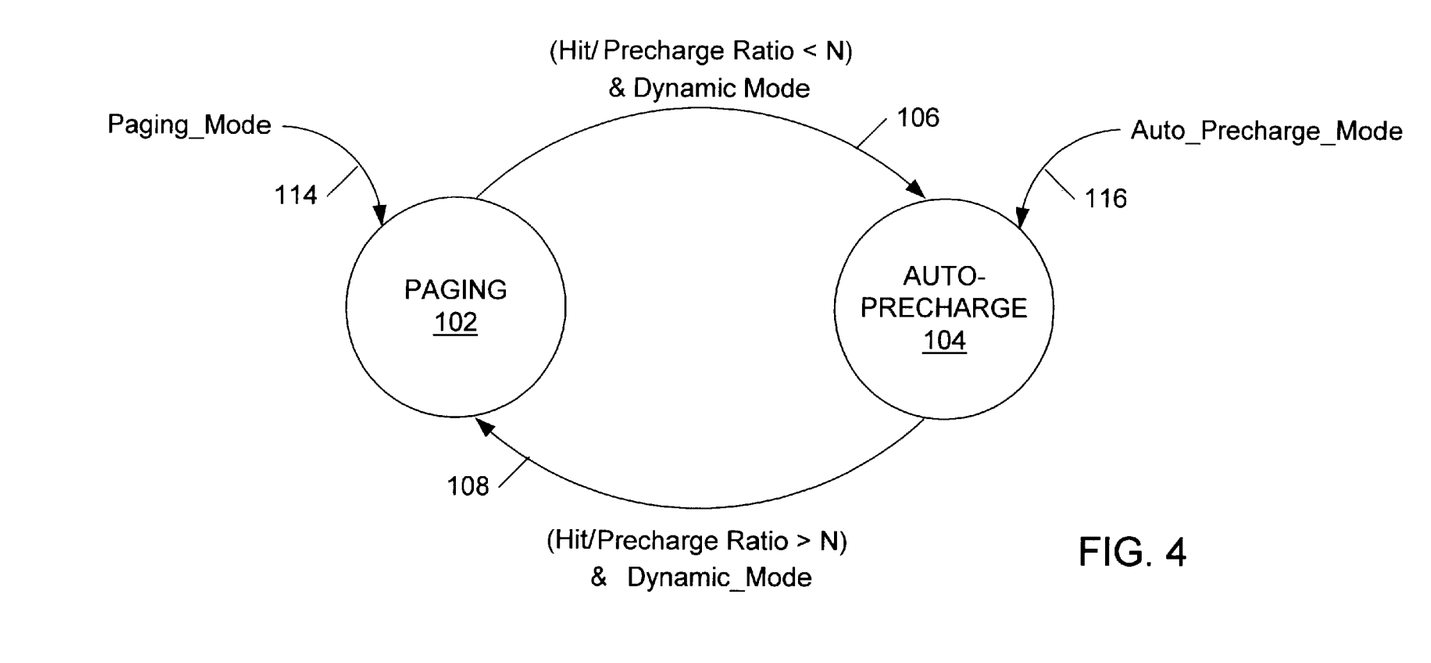
FIG. 4 is a state diagram of a state machine in which paging may be enabled, disable, or dynamically managed.

Turning now to FIG. 4, a state diagram is shown illustrating the operation of page state machine 82 for one embodiment of the present invention. If hit/precharge ratio<N is asserted, and the state machine is in paging state 102, transition line 106 indicates that the state machine switches to the auto-precharge state 104. If hit\precharge ratio>N, and the state machine is in auto-precharge state 104, transition line 108 indicates that the state machine switches to the paging state 102. Otherwise the current state is retained. When in auto-precharge state, memory controller 38 closes the accessed page after each access. For SDRAM, read/write with automatic precharge commands may be used. When in paging mode, the memory controller 38 leaves the accessed page open after the access. If paging__mode is asserted, transition line 114 indicates that the state machine is forced into the paging state 102. If auto__precharge__mode is asserted, transition line 116 indicates that the state machine is forced into auto-precharge state 104.

Returning now to FIG. 3, memory controller 38 may also include page table 86. Page table 86 may contain multiple entries that allow memory controller 38 to track open pages across multiple banks. In a preferred embodiment, page table 86 contains three entries. One entry tracks the current page status and the other two track two other pages that have been kept open (if paging is on). In a preferred embodiment, each entry may contain the following information:

1. Chip select (corresponding to MCS signals 62).
2. Logical Bank Select.
3. Row memory address.
4. Content Valid bit.
5. Most recently used bit.

Not all of the above information may be necessary to practice the invention. Chip select bits may indicate in which bank the page is located. In some embodiments, logical bank select bits may be used to indicate a logical bank within a physical bank. Row memory address bits define the page location within a bank. A content valid bit may be used to indicate if the entry is valid. A most recently used bit may be used to indicate which entry should be replaced to track a newly opened page. Alternatively, least recently used indication may be provided. When a new page is kept open, the entry for the least recently accessed page may be replaced with the new entry. Other replacement algorithms may also be employed. While the preferred page table embodiment includes three entries, fewer or more entries may be provided up to the maximum number of pages that may be open as determined by the memory configuration.

Hit/precharge logic 84 may compare accesses to the entries in page table 86 for determining if an access is a page hit or a miss/precharge and for calculating the hit:precharge ratio. Note that even when paging is not enabled, page table 86 may still be updated to track pages that would have been kept open if paging was enabled. This allows hit/precharge logic 84 to note accesses that would have been hits if paging were enabled.

Figure 5:
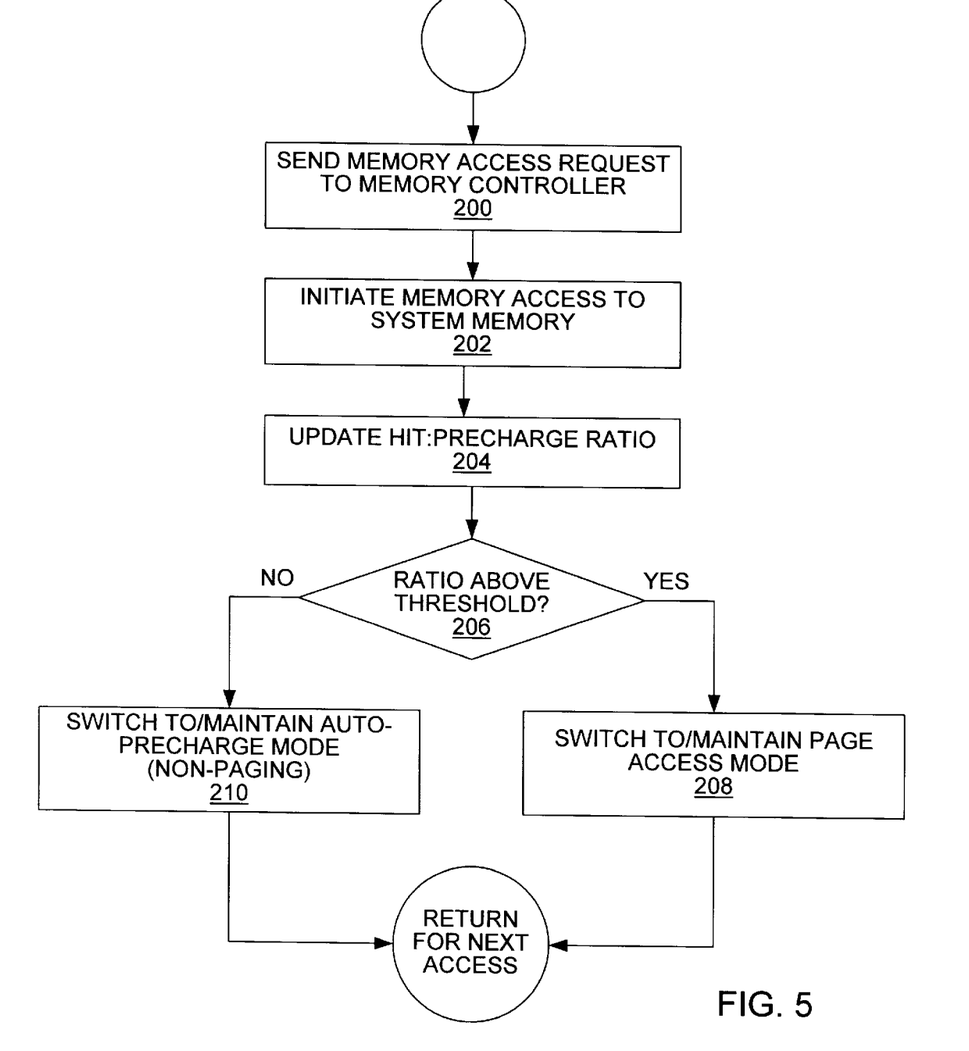
FIG. 5 is a flow diagram of a method for dynamic page management in a computer memory system.

Turning now to FIG. 5, a flow chart is provided illustrating a method for page management in a computer memory system. The flow diagram illustrates the general components of the method. The details of the method correspond to the details for the system described in FIGS. 1–4. The method includes sending a memory access request to a memory controller as indicated by reference numeral 200. Memory requests may be requested as described in conjunction with FIG. 2. Next the method includes initiating a memory access to a system memory, as indicated by reference numeral 202. Updating a hit:precharge ratio is then performed, as indicated by reference numeral 204. The hit:precharge ratio may be compared to a threshold value as indicated by reference numeral 206. If the ratio is above the threshold, page accessing is enabled as indicated by reference numeral 208. If the ratio is below the threshold, page accessing is disabled (auto-precharge mode) as indicated by reference numeral 210. The method illustrated in FIG. 5 may be further detailed by referring to the description of FIGS. 1–4, particularly FIGS. 3–4.

It will be appreciated to those skilled in the art having the benefit of this disclosure that this invention is believed to be capable of performing dynamic page management to improve throughput to memory within a computer system. Various modifications and changes may be made as would be obvious to a person skilled in the art having the benefit of this disclosure. It is intended that the following claims be interpreted to embrace all such modifications and changes, and, accordingly, the specification and drawings are to be regarded in an illustrative rather than a restrictive sense.

What is claimed is:

1. A computer, comprising:
   an electronic display;
   a plurality of memory banks configured to support page accesses and configured to present information stored therein to the electronic display;
   a memory controller coupled to said plurality of memory banks and adapted to control accesses to said plurality of memory banks, wherein said memory controller is further adapted to dynamically switch between a paging mode and an auto-precharge mode depending upon a hit:precharge ratio for accesses to said plurality of memory banks, wherein said memory controller comprises hit/precharge logic configured to determine if the current access is a page hit, a miss, or a miss requiring a precharge, wherein said hit:precharge ratio is the ratio of page hits to misses requiring a precharge;
   wherein when in said paging mode, after an access said memory controller leaves open the accessed page in said plurality of memory banks; and
   wherein when in said auto-precharge mode, said memory controller closes the accessed page in said plurality of memory banks after the access.

2. The computer as recited in claim 1, further comprising:
   a central processing unit (CPU); and
   a CPU bus linking said CPU to said memory controller, wherein said CPU bus is clocked by a system clock, wherein said CPU is adapted to send requests to access said plurality of memory banks across said CPU bus to said memory controller.

3. The computer as recited in claim 2, further comprising a peripheral bus coupled to said memory controller, wherein said memory controller is further adapted to receive memory access requests from said peripheral bus.

4. The computer as recited in claim 3, wherein said peripheral bus comprises a Peripheral Component Interconnect (PCI) bus.

5. The computer as recited in claim 3, further comprising a graphics device coupled to said memory controller, wherein said memory controller is further adapted to receive memory access requests from said graphics device.

6. The computer as recited in claim 5, wherein said graphics device is coupled to said memory controller by an Advanced Graphics Port (AGP).

7. The computer as recited in claim 3, further comprising a bus interface device adapted to couple said CPU bus to said peripheral bus.

8. The computer as recited in claim 7, wherein said memory controller is comprised within said bus interface device.

9. The computer as recited in claim 1, wherein said hit/precharge logic is configured to track said hit:precharge ratio, and wherein said memory controller is adapted to switch to said paging mode when said hit:precharge ratio is above a threshold and switch to said auto-precharge mode when said hit:precharge ratio is below the threshold.

10. The computer as recited in claim 9, wherein said memory controller is adapted to switch to said auto-precharge mode if the current access requires a precharge, and is adapted to switch to said paging mode if the current request is to the same page as the last request.

11. The computer as recited in claim 1, wherein:
   when in said paging mode, said memory controller leaves open a plurality of pages.

12. The computer as recited in claim 11, wherein said memory controller comprises a page table having entries for tracking which memory pages are left open.

13. The computer as recited in claim 12, wherein:
   said hit/precharge logic is configured to track said hit:precharge ratio;
   said hit/precharge logic compares the current access to the page table entries to determine if the current access is a hit to an open page, a miss, or a miss requiring a precharge; and
   said memory controller is adapted to switch to said paging mode when said hit:precharge ratio is above a threshold and switch to said auto-precharge mode when said hit:precharge ratio is below the threshold.

14. The computer as recited in claim 1, wherein said plurality of memory banks comprises synchronous dynamic random access memory (SDRAM).

15. A computer, comprising:
   an electronic display;
   at least one memory bank configured to support page accesses and configured to present information stored therein to the electronic display;

a memory controller coupled to said at least one memory bank and adapted to control accesses to said at least one memory bank; and a configuration register coupled to said memory controller, said configuration register adapted to indicate an operation mode to said memory controller, said configuration register programmable to select said operation mode as an auto-precharge mode, a paging mode, or a dynamic mode;

wherein when said auto-precharge mode is selected, said memory controller operates in an auto-precharge state wherein said memory controller closes the accessed memory page in said at least one memory bank after each access;

wherein when said paging mode is selected, said memory controller operates in a paging state wherein said memory controller leaves open the accessed page in said at least one memory bank after an access; and wherein when said dynamic mode is selected, said memory controller is adapted to dynamically switch between said auto-precharge state and said paging state depending upon a hit:precharge ratio for accesses to said at least one memory bank.

16. The computer as recited in claim 15, wherein said memory controller comprises hit/precharge logic for tracking said hit:precharge ratio when said dynamic mode is selected, and wherein when in said dynamic mode said memory controller is adapted to switch to said paging state when said hit:precharge ratio is above a threshold and switch to said auto-precharge state when said hit:precharge ratio is below the threshold.

17. The computer as recited in claim 16, wherein when in said dynamic mode said memory controller is adapted to switch to said auto-precharge state if the current access requires a precharge, and is adapted to switch to said paging state if the current request is to the same page as the last request.

18. The computer as recited in claim 15, wherein:
said at least one memory bank comprises a plurality of memory banks; and
when in said paging mode, said memory controller leaves open a plurality of pages.

19. The computer as recited in claim 18, wherein said memory controller comprises a page table having entries for tracking which memory pages have been most recently accessed.

20. The computer as recited in claim 19, wherein:
said memory controller comprises hit/precharge logic for tracking said hit:precharge ratio in said dynamic mode;
said hit/precharge logic compares the current access to the page table entries to determine if the current access is a hit to page indicated in one of the page table entries, a miss, or a miss requiring a precharge; and
said memory controller is adapted to switch to said paging state when said hit:precharge ratio is above a threshold and switch to said auto-precharge state when said hit:precharge ratio is below the threshold.

21. The computer as recited in claim 19, wherein for each page indicated by one of said page table entries, the page table entry indicates in which one of said plurality of memory banks the page is located and the row address of the page.

22. The computer as recited in claim 21, each page table entry further provides a least recently used indication.

23. The computer as recited in claim 15, wherein said at least one memory bank comprises synchronous dynamic random access memory (SDRAM).

24. The computer as recited in claim 15, further comprising:
a central processing unit (CPU);
a CPU bus linking said CPU to said memory controller, wherein said CPU bus is clocked by a system clock, wherein said CPU is adapted to send requests to access said at least one memory bank across said CPU bus to said memory controller;
a peripheral bus coupled to said memory controller, wherein said memory controller is further adapted to receive memory access requests from said peripheral bus;
a graphics device coupled to said memory controller, wherein said memory controller is further adapted to receive memory access requests from said graphics device; and
a bus interface device adapted to couple said CPU bus to said peripheral bus and to said graphics device, wherein said memory controller is comprised within said bus interface device.

25. A system, comprising:
at least one memory bank configured to support page accesses; and
a memory controller coupled to said at least one memory bank and adapted to control accesses to said at least one memory bank, wherein said memory controller is further adapted to dynamically switch between a paging mode and an auto-precharge mode according to a ratio of page hits to page misses requiring precharge for accesses to said at least one memory bank;
wherein when in said paging mode, after an access said memory controller leaves open the accessed page in said at least one memory bank; and
wherein when in said auto-precharge mode, after each access said memory controller closes the accessed page in said at least one memory bank.

26. A system comprising:
at least one memory bank configured to support page accesses; and
a memory controller coupled to said at least one memory bank and adapted to control accesses to said at least one memory bank, wherein said memory controller is further adapted to dynamically switch between a paging mode and an auto-precharge mode, wherein said memory controller switches to said auto-precharge mode if the current access requires a precharge, and switches to said paging mode if the current request is to the same page as the last request;
wherein when in said paging mode, after an access said memory controller leaves open the accessed page in said at least one memory bank; and
wherein when in said auto-precharge mode, after each access said memory controller closes the accessed page in said at least one memory bank.

27. A system comprising: at least one memory bank configured to support accesses; and
a memory controller coupled to said at least one memory bank and adapted to control accesses to said at least one memory bank, wherein said memory controller is further adapted to dynamically switch between a paging mode and an auto-precharge mode, wherein said memory controller switches to said auto-precharge mode if a plurality of consecutive accesses required a precharge, and switches to said paging mode if a plurality of consecutive accesses are to the same page;

wherein when in said paging mode, after an access said memory controller leaves open the accessed page in said at least one memory bank; and wherein when in said auto-precharge mode, after each access said memory controller closes the accessed page in said at least one memory bank.

28. A system comprising:

at least one memory bank configured to support page accesses; and a memory controller coupled to said at least one memory bank and adapted to control accesses to said at least one memory bank, wherein said memory controller is further adapted to dynamically switch between a paging mode and an auto-precharge mode, wherein said memory controller dynamically switches between a paging mode and an auto-precharge mode according to the source of the access request;

wherein when in said paging mode, after an access said memory controller leaves open the accessed page in said at least one memory bank; and wherein when in said auto-precharge mode, after each access said memory controller closes the accessed page in said at least one memory bank.

29. A system comprising:

at least one memory bank configured to support page accesses; and a memory controller coupled to said at least one memory bank and adapted to control accesses to said at least one memory bank, wherein said memory controller is further adapted to dynamically switch between a paging mode and an auto-precharge mode, wherein said memory controller dynamically switches between a paging mode and an auto-precharge mode according to a power management state;

wherein when in said paging mode, after an access said memory controller leaves open the accessed page in said at least one memory bank; and wherein when in said auto-precharge mode, after each access said memory controller closes the accessed page in said at least one memory bank.

30. A method for page management in a computer memory system, comprising:

sending a memory access request to a memory controller;

initiating a memory access corresponding to the memory access request;

updating a hit:precharge ratio as each memory accesses is performed, wherein said hit:precharge ratio is the ratio of page hits to misses requiring a precharge;

switching to a paging mode if said hit:precharge ratio is above a threshold, wherein a memory page for a current access remains open after the access; and switching to an auto-precharge mode if said hit:precharge ratio is below a threshold, wherein a memory page for a current access is closed immediately after the access.

* * * * *